(No Model.)  2 Sheets—Sheet 1.

C. G. BURKE.
TELEGRAPHIC RELAY.

No. 559,479.  Patented May 5, 1896.

Witnesses:
Ernest Hopkinson
James N. Catlow

Charles G. Burke, Inventor
by Parker W. Page, Attorney.

(No Model.)

C. G. BURKE.
TELEGRAPHIC RELAY.

No. 559,479.

2 Sheets—Sheet 2.

Patented May 5, 1896.

Witnesses:
Ernest Hopkinson
James M. Catlow.

Charles G. Burke, Inventor
by Parker W. Page
Attorney.

UNITED STATES PATENT OFFICE.

CHARLES G. BURKE, OF BROOKLYN, NEW YORK.

TELEGRAPHIC RELAY.

SPECIFICATION forming part of Letters Patent No. 559,479, dated May 5, 1896.

Application filed November 21, 1895. Serial No. 569,671. (No model.)

*To all whom it may concern:*

Be it known that I, CHARLES G. BURKE, a citizen of the United States, residing at Brooklyn, in the county of Kings and State of New York, have invented certain new and useful Improvements in Telegraphic Relays, of which the following is a specification, reference being had to the drawings accompanying and forming a part of the same.

The invention the subject of my present application is an improvement in cable-relays or instruments of like character which are required to be of great sensitiveness in responding to current changes and which involve a coil of wire placed in a magnetic field, adapted, by the passage through it of an electric current, to be moved or rotated in such field. The improvements which I have made are applicable to this class of instruments generally, and reside in a novel and more effective disposition of magnets or magnetic poles for producing the field or lines of force, and in a new and improved form of coil. I shall describe and explain the nature of said improvements by reference to the accompanying drawings.

Figure 1:
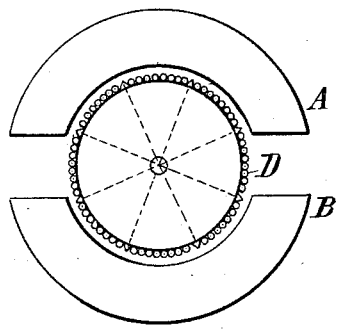
Figure 2:
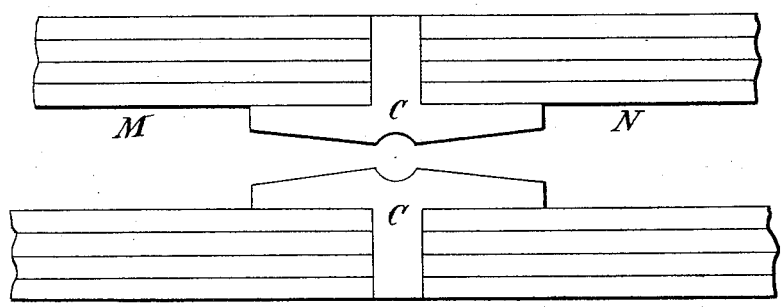
Figure 3:
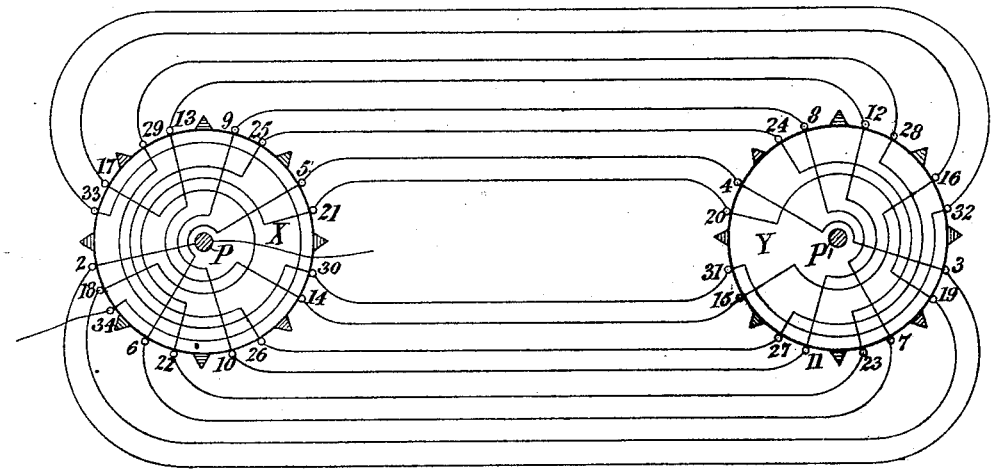
Figure 4:
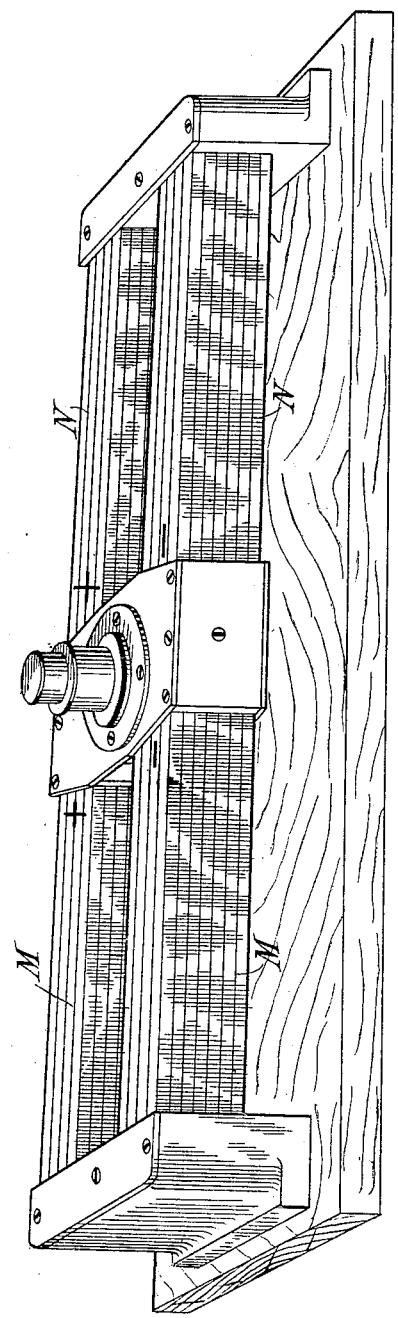

Figure 1 is an enlarged view of the coil in horizontal section, shown in its position between the pole-pieces. Fig. 2 is a top plan view of a portion of the magnets. Fig. 3 is diagram for illustrating the method or plan of winding the coil. Fig. 4 is a perspective view of the apparatus complete.

I have shown only such portions of a relay instrument as are necessary to an understanding of my invention, as in all respects not specifically noted herein its construction is, or may be, similar to any that are well known or heretofore used. The field of force is maintained by the four poles of two separate and distinct compound permanent magnets M N, having, respectively, their like poles presented to one another in direct lines. Between the like poles of the separate magnets pieces of soft iron C are fitted, which serve as pole-pieces common to both magnets and inductively localize in themselves the energy of the magnetized steel bars which constitute the like poles of the magnets. By means of this disposition the distinctive individual character of the magnets is preserved, while their combination as a whole is relatively that of contiguous opposite poles of a single magnet, and the intensity of the field is made proportionate to the combined strength of all the magnetized bars or poles entering into the combination on either side. It will be noted also that the soft-iron pole-pieces are so shaped as to localize the magnetic forces or lines in the center of the field, which becomes the center of a circle three-eighths of the circumference of which on opposite sides are bounded by the faces of the said soft-iron pole-pieces, the other two-eighths being embraced in the longitudinal spaces between the pole-pieces. The field is consequently a circular one and may be considered as divided into eight equal parts, three of which constitute or are bounded by the circular face of one pole of the field, and three the circular face of the other pole, while the other two are comprised between the poles, the distance between which at their nearest approximation being one-eighth of the circumference of the field. Within this field the actuating-coil D is suspended in the usual manner. The coil, as shown in the figures, is circular in horizontal cross-section and fills the central opening or field with just sufficient clearance to turn freely therein.

The relation of the coil to the field or pole-pieces thereof is illustrated in Fig. 1, in which A B designate any pole-pieces, whether of the special character of those marked C in Fig. 2 or otherwise.

The coil is divided into eight equal parts or segments, in four of which segments on one side the path for the current is upward, while in the four corresponding segments on the other side the path is downward, thus presenting opposition of direction in each half of the coil in opposite sides of the field, and the wire is applied in such manner that the winding itself is continuous. The coil, moreover, is so wound that no two adjacent convolutions or paths in the same direction in their respective segments are immediately successive with each other—that is to say, the current passing through any given convolution or path in one segment must pass through one convolution in each of the other segments before it again traverses this particular segment—and the course of the wire or path for the current from segment to segment is at such angles that it crosses itself four times at each end of the coil in alternately opposite directions for each complete round in the winding.

A coil of the kind described is capable of being rotated through one-half of a circle by the passage through it of an electric current when it is suspended or supported properly in the field which I have shown and will move quickly and efficiently in either direction from practically any position in response to currents of opposite direction. The particular advantage of the coil, however, resides in the special winding described, by means of which the self-induction and consequent retarding effect of the coil is broken up and reduced to a minimum.

In many respects the construction of the coil, the number of segments or divisions, and other unimportant features may be varied without departing from the spirit of my invention; but I have found by practical experience that the special form herein described best meets the requirements of practical working.

To illustrate now in detail the method or plan which I have devised and adopted for winding the coil, I have prepared the diagram Fig. 3. The bobbin or core for the coil, which is cylindrical in form, is divided into eight equal divisions in any convenient manner. At each end of the spool or core is a central pivotal point P P', adapted to such use as may be required of it.

X represents what we may consider the upper end or top of the spool or coil, and Y the opposite end. To the pivotal pin or point P on the top of the spool I secure the end of what constitutes the inside wire and beginning the winding carry it to any point, as 2, on the side of the spool. The wire is then laid or wound along the side of the spool and parallel to the axis of the same, being carried at the opposite end of the spool from point 3 across the lower end of the core to 4 and thence up to 5, thus completing one convolution in two opposite and corresponding divisions or coil-sections. In like manner a convolution is wound in each of the six remaining divisions until the first round is completed, care being observed to wind the wire upward in four adjacent sections or divisions and downward in the others. By following the up-and-down lines in the diagram and the points which are successively numbered this plan of winding will be readily followed. When the end of the first round is reached by the wire being brought up to point 17, it is carried across the top of the spool to 18, thence down to 19, and so on, to wind or lay a second convolution in each division, and this plan is followed until the desired number of convolutions is applied. The free ends of the wire are arranged for connection with a circuit in any proper and well-understood way.

I have used relay instruments provided with magnets and coils of the kind described and found them capable of quicker, more positive, and more reliable operation than any others of which I am aware.

What I claim is—

1. The combination in an instrument of the kind described, of two permanent magnets presenting their respective poles to each other, one pole of one magnet being joined to a like pole of the other magnet by a pole-piece of soft iron common to both and forming one side of the field, the other like poles of the magnets being similarly joined together by a soft-iron pole-piece forming the other side of the field, the conjoint poles of like polarity being in line with each other at one side of the field and parallel with the conjoint poles of opposite polarity at the other side of the field, and a coil supported in the space between the pole-pieces and capable of limited movement at right angles to the lines of force therein.

2. A rotary coil for relay instruments adapted to be suspended or supported in a magnetic field and consisting of a spool or core with a conductor wound thereon in convolutions parallel with its axis, the direction of the winding being opposite in opposite halves of the coil, and no two immediately successive convolutions or paths in the same direction being contiguous to each other, as set forth.

3. The combination with magnetic poles and within a circular field of force maintained thereby, of a suspended rotary coil, composed of an equal number of sections or divisions, the direction of winding of the sections on one side of the diameter of the coil being opposite to that of the remaining sections, successive convolutions being laid or wound in order in the different sections or divisions, as set forth.

4. A cylindrical coil wound longitudinally in sections, the course of the wire in adjacent sections of one half of the coil being in a direction opposite to that of the course of the wire in adjacent sections of the other half of the coil, the direction of the winding being downward in one section on one side of the coil and upward in the corresponding section at the opposite side of the coil and progressively from section to section.

CHARLES G. BURKE.

Witnesses:
M. L. DYER,
ERNEST HOPKINSON.